US012767573B2

(12) United States Patent
Matteson et al.

(10) Patent No.: US 12,767,573 B2
(45) Date of Patent: Oct. 20, 2026

(54) TREATING WASTEWATER FOR REUSE

(71) Applicant: ReUse Oilfield Services, Inc., Soddy Daisy, TN (US)

(72) Inventors: Troy Jason Matteson, Liberty Hill, TX (US); Michael John Saturno, Soddy Daisy, TN (US)

( * ) Notice: Subject to any disclaimer, the term of this patent is extended or adjusted under 35 U.S.C. 154(b) by 437 days.

(21) Appl. No.: 18/416,331

(22) Filed: Jan. 18, 2024

(65) Prior Publication Data

US 2024/0246846 A1 Jul. 25, 2024

Related U.S. Application Data

(60) Provisional application No. 63/439,903, filed on Jan. 19, 2023.

(51) Int. Cl.
*C02F 9/00* (2023.01)
*B01D 61/02* (2006.01)
(Continued)

(52) U.S. Cl.
CPC .............. *C02F 9/00* (2013.01); *B01D 61/025* (2013.01); *B01D 61/10* (2013.01); *B01D 61/12* (2013.01);
(Continued)

(58) Field of Classification Search
CPC .... C02F 9/00; C02F 1/76; C02F 3/006; C02F 3/1268; C02F 1/32; C02F 1/441; C02F 1/68; C02F 1/74; C02F 3/1273; C02F 11/122; C02F 2103/10; C02F 2301/046; C02F 2301/063; C02F 2303/04; B01D 61/025; B01D 61/10; B01D 61/12; B01D 69/02; B01D 2311/04; B01D 2311/12;
(Continued)

(56) References Cited

U.S. PATENT DOCUMENTS

2007/0241053 A1* 10/2007 Uchida ................ C02F 3/1273 210/631
2007/0289923 A1* 12/2007 Ikebe ...................... C05F 7/005 210/610
(Continued)

FOREIGN PATENT DOCUMENTS

CN 103313943 A * 9/2013 ................ C02F 1/40
EP 2240413 B1 * 1/2020 ................ C02F 9/00
WO WO-2021061402 A1 * 4/2021 ........... B01D 61/423

OTHER PUBLICATIONS

Machine-generated English translation of CN 103313943, generated on May 21, 2026.*

*Primary Examiner* — Fred Prince
(74) *Attorney, Agent, or Firm* — Jeffrey L. Streets

(57) ABSTRACT

A system and method produce a treated effluent from untreated wastewater. An untreated wastewater is obtained from a wastewater source and processed in a membrane bioreactor to produce treated effluent. The treated effluent is then processed in the first reverse osmosis system. Optionally, an effluent permeate produced by the first reverse osmosis system is injected into a subterranean formation through an injection well, wherein formation water is subsequently extracted from the subterranean formation through a recovery well and processed in a reverse osmosis system to produce a permeate water stream which may be supplied to a potable water distribution system.

20 Claims, 7 Drawing Sheets

(51) Int. Cl.

| | |
|---|---|
| ***B01D 61/10*** | (2006.01) |
| ***B01D 61/12*** | (2006.01) |
| ***B01D 69/02*** | (2006.01) |
| ***C02F 1/32*** | (2023.01) |
| ***C02F 1/44*** | (2023.01) |
| ***C02F 1/68*** | (2023.01) |
| ***C02F 1/74*** | (2023.01) |
| ***C02F 1/76*** | (2023.01) |
| ***C02F 3/00*** | (2023.01) |
| ***C02F 3/12*** | (2023.01) |
| ***C02F 11/12*** | (2019.01) |
| ***E21B 43/30*** | (2006.01) |
| *C02F 11/122* | (2019.01) |
| *C02F 103/10* | (2006.01) |

(52) U.S. Cl.

CPC ................ *B01D 69/02* (2013.01); *C02F 1/76* (2013.01); *C02F 3/006* (2013.01); *C02F 3/1268* (2013.01); *E21B 43/30* (2013.01); *B01D 2311/04* (2013.01); *B01D 2311/12* (2013.01); *B01D 2311/2619* (2013.01); *B01D 2313/243* (2013.01); *B01D 2313/50* (2013.01); *B01D 2315/06* (2013.01); *B01D 2325/02833* (2022.08); *C02F 1/32* (2013.01); *C02F 1/441* (2013.01); *C02F 1/68* (2013.01); *C02F 1/74* (2013.01); *C02F 3/1273* (2013.01); *C02F 11/122* (2013.01); *C02F 2103/10* (2013.01); *C02F 2301/046* (2013.01); *C02F 2301/063* (2013.01); *C02F 2303/04* (2013.01)

(58) Field of Classification Search

CPC ...... B01D 2311/2619; B01D 2313/243; B01D 2313/50; B01D 2315/06; B01D 2325/02833; E21B 43/30

USPC .... 210/605, 609, 614, 615, 252, 259, 748.1, 210/748.11

See application file for complete search history.

(56) References Cited

U.S. PATENT DOCUMENTS

| | | | | |
|---|---|---|---|---|
| 2009/0255673 | A1 * | 10/2009 | Minnich ................... | C02F 9/00 166/371 |
| 2010/0038310 | A1 * | 2/2010 | Shafer ....................... | C02F 9/00 210/151 |
| 2014/0231344 | A1 * | 8/2014 | Ishihara ................. | B01D 61/58 210/601 |
| 2016/0046503 | A1 * | 2/2016 | Hoek ..................... | B01D 61/22 210/741 |
| 2016/0368783 | A1 * | 12/2016 | Ertel ....................... | C02F 1/048 |
| 2018/0009688 | A1 * | 1/2018 | Ertel ....................... | C02F 3/305 |

* cited by examiner

TREATING WASTEWATER FOR REUSE

BACKGROUND

The present disclosure relates to wastewater treatment systems that produce treated effluent that may be suitable for one or more reuse, including the production of potable water.

BACKGROUND OF THE RELATED ART

Potable water is safe to be used as drinking water. Potable water or drinking water comes from surface and ground water sources and is then treated to meet state and federal standards for water that is safe to consume. Consumption of untreated water can cause gastrointestinal problems. The United States Environmental Protection Agency (EPA) has established national Primary Drinking Water Regulations that identify the maximum contaminant levels (MCLs) for a variety of contaminants. In a municipal setting, potable water may be efficiently distributed through a system of pipes referred to as a water supply distribution system.

Water reclamation is the process of converting municipal or industrial wastewater into treated effluent that can be reused for one or more purposes. The reuse of treated effluent may be categorized by the end use of the treated effluent, including urban reuse, agricultural reuse or irrigation, environmental reuse, industrial reuse, or potable water reuse, or any other governmental approved use. The injection of treated effluent into the water supply distribution system is known as direct potable reuse.

BRIEF SUMMARY

Some embodiments provide a method for producing potable water from wastewater. The method comprises obtaining a wastewater influent from a wastewater source and processing the wastewater influent in a membrane bioreactor to produce a treated effluent, with an optional final treatment to potable levels through reverse osmosis or UV as desired for some applications. Optionally, some embodiments may further comprise injecting the permeate effluent stream into a subterranean formation through an injection well, extracting formation water from the subterranean formation through a recovery well, processing the formation water in a reverse osmosis system to produce a permeate water stream, and supplying the permeate water stream to a potable water distribution system.

Some embodiments provide a wastewater treatment system. One wastewater treatment system comprises a membrane bioreactor having a first inlet coupled to receive wastewater influent from a wastewater source and producing a treated effluent, and the first reverse osmosis system having a first inlet receiving the treated effluent and a permeate effluent outlet coupled to a permeate effluent vessel. Optionally, the system may further include an injection well having an injection pump inlet coupled to the permeate vessel and an injection pump outlet coupled to an injection well that extends into a subterranean formation, a recovery well pump having a recovery pump inlet coupled to a recovery well that extends into the subterranean formation and a recovery pump outlet, and a reverse osmosis system having a second inlet coupled to the recovery pump outlet and a permeate water outlet coupled to a permeate water vessel, wherein the permeate water vessel is coupled to a potable water distribution system.

DETAILED DESCRIPTION

Figure 1:
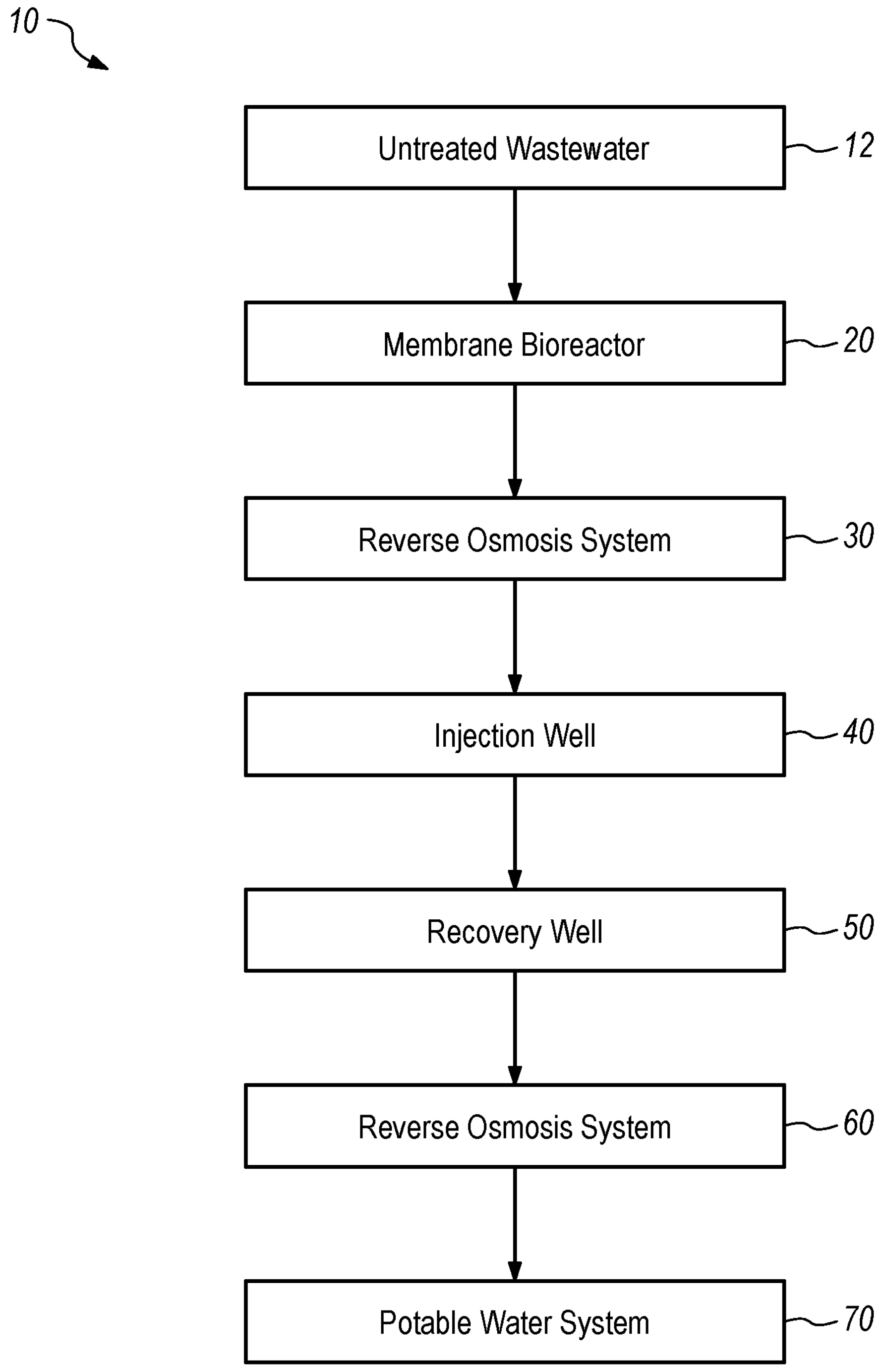
FIG. 1 is a basic flowchart of a wastewater treatment system for production of potable water from wastewater.

Some embodiments provide a method for producing potable water from wastewater. The method comprises obtaining a wastewater influent from a wastewater source, processing the wastewater influent in a membrane bioreactor to produce a treated effluent, and processing the treated effluent in a membrane bioreactor (MBR) system to produce a permeate effluent stream. Optionally, some embodiments may further comprise injecting the permeate effluent stream into a subterranean formation through an injection well, extracting formation water from the subterranean formation through a recovery well, processing the formation water in a reverse osmosis system to produce a permeate water stream, and supplying the permeate water stream to a potable water distribution system.

A wastewater treatment plant or system is a facility configured to perform a wastewater treatment process. A wastewater treatment process is a process used to remove or degrade contaminants from untreated wastewater and produce treated effluent for some type of end use, reuse and/or discharge into the environment. The type of untreated wastewater may include industrial wastewater, agricultural wastewater, or domestic wastewater, also referred to as municipal wastewater or sewage. Domestic or municipal wastewater may include, for example, water from households, such as wastewater from toilets, showers, sinks and various appliances. Optionally, the untreated wastewater may be delivered to the wastewater treatment plant by a truck, such as a pump truck, or through a pipe coupled to a municipal sewer system, which may be a combined sewer system that further includes stormwater and other urban runoff water.

A wastewater treatment plant utilizes sludge as a source of bacteria for reducing organic material in the untreated wastewater and may also produce excess sludge that must be removed from the wastewater treatment plant. During startup, the wastewater treatment plant may be seeded with sludge, whereas a portion of the sludge may be removed from the wastewater treatment plant during normal operation.

A membrane bioreactor (MBR) is a wastewater treatment process or unit that combines a membrane separation process, such as microfiltration or ultrafiltration, with a biological wastewater treatment process, such as a conventional activated sludge treatment process. A membrane having a very fine pore size is used to retain microorganisms and particulates within an aerated vessel and produce a highly clarified water effluent. The membranes may be made with an organic polymer, such as polyacrylonitrile (PAN), high density polyethylene (HDPE), polyethylsulphone (PES), polysulphone (PS), polytetrafluoroethylene (PTFE) or polyvinylidene difluoride (PVDF), or a ceramic material, such as aluminium oxide (alumina), silicon carbide, titanium dioxide (titania) or zirconium dioxide (zirconia). One preferred membrane has a constant pore size over the entirety of a membrane plate and the constant pore size is preferable about 0.038 microns. Many available membrane plates may have a stated nominal pore size, but the actual range of pore sizes within the membrane may vary greatly, such as pore sizes varying by as much as 0.06 microns from one pore to another. Suitable membrane modules having a consistent pore size may be obtained from A3-USA located in North Carolina. Regardless of the exact type of membrane bioreactor or membrane construction, the membrane bioreactor produces a treated effluent stream. In one option, the membrane bioreactor may be a submerged membrane bioreactor (SMBR), which is characterized by the membrane being located inside the biological reactor and submerged in the wastewater or sludge that is being treated. In another option, a settling vessel or pond and an aeration vessel or process may be upstream of the membrane bioreactor to receive the wastewater and provide that wastewater to the membrane bioreactor.

A reverse osmosis (RO) system removes contaminants from the treated effluent when pressure forces water molecules in the treated effluent through a semipermeable membrane. The semipermeable membrane in a reverse osmosis system has small pores that block contaminants but allow the passage of water molecules. Treated effluent may be pressurized such that water molecules within the treated effluent flow from the more contaminant-concentrated side of the membrane to the less contaminant-concentrated side to provide a permeate effluent with fewer contaminants. The aqueous stream produced through the RO membrane is referred to as the permeate, whereas the treated effluent and contaminants that do not pass through the RO membrane are referred to as the concentrate, RO waste or brine.

An injection well is a structure used to place fluid underground into a porous geologic subterranean formation. The underground formation may range from deep sandstone or limestone to a shallow soil layer, or even an aquifer. Injection well construction depends on the type of fluid and the depth to which the fluid is being injected but may be bored or drilled with a tubular shaft. An injection well pump may be used to convey treated effluent into an injection well pipe that extends downward into the subterranean formation.

A recovery well is a structure used to extract underground water from a porous geologic subterranean formation. A recovery well pump may be used to draw water from the subterranean formation and up through a recovery well pipe to an above ground location. Without limitation, the injection well and/or the recovery well at any particular site may extend underground to any subsurface depth.

A distance of separation between an injection well and a recovery well may have a direct effect on the amount of remediation, conditioning and/or mixing that the treated effluent will experience as it passes from the injection site through the subterranean formation to the recovery well site. Without limitation, a preferred distance of separation is between about 200 feet and about 500 feet but may vary according to the porosity of subterranean formation.

In some embodiments, the method of wastewater processing may further include a chemical treatment, such as chlorine injection, to the permeate from the reverse osmosis system before the permeate water is delivered to a selected end use or reuse, such as a water supply distribution system. In one example, the method may include adding from 0.5 part per million to 2 parts per million of chlorine to the permeate water before supplying the permeate water to the potable water distribution system.

In some embodiments, the method may further comprise an ultraviolet light treatment of the treated effluent produced by the membrane bioreactor or the water obtained from the recovery well. The ultraviolet light treatment may be used in combination with, or instead of, the reverse osmosis system and/or the chemical treatment. The selection and use of these post-recovery processes may vary depending on the selected end use or reuse of the water.

In some embodiments, the MBR system forms a first waste stream and the reverse osmosis system forms a second waste stream. The first and second waste streams include the materials that do not pass through the membrane of each system. Optionally, the first and second waste streams may be combined for disposal.

In some embodiments, the reverse osmosis system may be replaced by, or used in combination with, the chemical treatment and/or the ultraviolet treatment. In other words, the nature of the wastewater treatment process prior to the injection well may be selected in order to meet applicable wastewater quality standards for injection into a subterranean formation and the nature of the water treatment process subsequent to the recovery well may be selected in order to meet applicable water quality standards for delivery into a water supply distribution system.

Some embodiments provide a wastewater treatment system comprising a membrane bioreactor (MBR) system having a first inlet coupled to receive wastewater influent from a wastewater source and an outlet producing treated effluent. An MBR system has a first inlet coupled to the treated effluent outlet of the membrane bioreactor system and a permeate effluent outlet coupled to a permeate effluent vessel. Optionally, the wastewater treatment system may further include an injection well having an injection pump inlet coupled to the permeate effluent vessel and an injection pump outlet coupled to the injection well that extends into a subterranean formation. Furthermore, the system may include a recovery well pump having a recovery pump inlet coupled to a recovery well that extends into the subterranean formation and a recovery pump outlet. Still further, a reverse osmosis system may have an inlet coupled to the recovery pump outlet and a permeate water outlet coupled to a permeate water vessel, which may be coupled to a potable water distribution system.

In some embodiments, the treated effluent produced by the wastewater treatment systems and methods described herein may be discharged to other processes or uses. Some of these processes or uses may be surface applications, sub-surface applications, and/or direct reuse. Non-limiting examples of surface applications for the treated effluent include surface drip tubing, surface spray fields, surface evaporation ponds and/or any evaporation method. Non-limiting examples of subsurface application for the treated effluent include input to an injection well, such as a Class 1, 3, 4 or 5 injection well (as defined and regulated by the Texas Commission on Environmental Quality (TCEQ) and subsurface drip tubing. Non-limiting examples of direct reuse include agriculture, home, business, manufacturing and the like. In still further examples, the treated effluent may be discharged into a body of water or soil formation. Embodiments may provide the treated effluent to a public water supply (PWS).

In some embodiments, the wastewater treatment may include additional treatment processes. For example, the treated effluent permeate from the permeate vessel may be treated with ultraviolet (UV) light and/or passed through a reverse osmosis (RO) unit. The choice to include one or more of these additional treatment processes will depend upon the intended end use, reuse or application for the treated effluent.

In some embodiments, the wastewater treatment system may include a spectrometer. A spectrometer is a scientific instrument used to measure spectral components of a physical phenomenon. The term "spectrometer" is often broadly used to describe instruments that measure a continuous variable of a phenomenon where the spectral components are somehow mixed. A preferred spectrometer is an optical spectrometer. The spectrometer is preferably positioned to test the quality of the treated effluent prior to discharge or use, such as between a final treatment stage and the discharge point. Essentially, this spectrometer is used as a last safety measure to ensure the treated effluent is not discharged if it still contains contaminants. If the spectrometer registers some spectral component that should not be present, a controller may automatically actuate a valve system to divert the flow away from the intended discharge method and into some other form of a holding system until the treated effluent and/or the wastewater treatment system can be evaluated to determine the cause of the spectral component. Once adequately addressed or reprocessed, the valve system may then redirect the flow to the intended discharge method. The valve system may be directly downstream of the spectrometer and may include one or more manual and/or automated valves which will be used to control the direction of the flow.

In some embodiments, the wastewater treatment system may be started (i.e., "seeded") with a sludge that contains various microorganisms that are beneficial for wastewater treatment. By seeding the wastewater treatment system, these important microorganisms are known to be present in the system even prior to receiving influent untreated wastewater.

The term "sludge" refers to an aqueous liquid, which is typically brown and viscous, that remains after raw sewage has been filtered to remove debris. The sludge itself is inhabited by a diverse community of microbes (also known as "microorganisms"), for example including bacteria, protozoans and even some eukaryotes like tardigrades, that arise from various biological processes and sources to end up in the sewers connecting our homes to the waste management facility. Sludge comprises an incredibly rich medium, full of organic matter including fecal matter in which bacteria thrive. Once this sludge has been processed by bacteria, it is called activated sludge, which can refer to both the organic and biological matter itself and the waste management process.

The wastewater treatment system provides conditions that enable these microbes to thrive, which in turn helps to reduce the amount of waste contained in the wastewater since the bacteria consumes the organic matter. The term "activated sludge" refers to sludge in which bacteria is active in consuming organic matter as opposed to a septic tank where the conditions are stagnant and there is a much lower rate at which bacteria consume organic matter. The sludge that is initially brought in to seed the wastewater treatment system is not raw sewage, but a byproduct of raw sewage that has gone through some form of biological treatment. This sludge contains organic matter and, due to treatment with air, has a high level of bacterial activity for consuming more organic matter. Sludge may be obtained from another wastewater treatment plant or similar biological process for the purpose of seeding the wastewater treatment plant.

The waste activated sludge process is a kind of sewage treatment that blows oxygen (typically in the form of air) into unsettled, raw or untreated sewage, which fosters bacterial digestion of pollutants and organic matter to keep a wastewater treatment system in balance (i.e., balancing a mixed liquor suspended solids (MLSS) concentration in accordance with an incoming biological oxygen demand (BOD)). The process of blowing oxygen (or air) through a wastewater stream is referred to as "aeration" (oxic) and takes place in an aeration (oxic) vessel. Once this process establishes "activated sludge", the activated sludge may be used to seed the wastewater treatment system.

Activated sludge may be added to the wastewater treatment system from time to time or in response to some condition that has caused a reduction in the amount of activated sludge present in the wastewater treatment system. For example, a supplemental activated sludge may be added to the wastewater treatment system if the wastewater treatment system receives a load of waste that unknowingly contains chemicals, such as bleach, that kill or reduce the bacteria in the system. Alternatively, it may be possible to raise the concentration of bacteria in the wastewater treatment system by adding other products, such as sugar.

The seeded wastewater treatment system provides a combination of processes with air (oxic processes) and without air (anoxic processes) creating a balance of oxic and anoxic conditions found to achieve the most effective treatment levels, known as nitrification and denitrification. The balance between oxic and anoxic conditions may be periodically or continuously adjusted to achieve a desired treatment level.

FIG. 1 is a basic flowchart of a wastewater treatment system 10 for production of potable water from untreated wastewater. A wastewater treatment plant may process the untreated wastewater 12, such as domestic wastewater, to produce treated effluent that is suitable for certain uses and/or discharge to the environment. The untreated wastewater influent to the wastewater treatment plant is processed in a membrane bioreactor 20 to produce a treated effluent that is directed to a first reverse osmosis system 30. The first reverse osmosis system 30 directs the treated effluent to the first side of a semipermeable membrane under pressure and collects treated effluent permeate from a second side of the semipermeable membrane. The treated effluent permeate may then be provided to an injection well 40 for delivery to a subterranean formation.

A recovery well 50 extracts water from the subterranean formation. An amount of remediation, conditioning and/or mixing of treated effluent will vary based on the type of formation, the distance of separation between the injection and recovery wells, the treated effluent flow rate into the subterranean formation, the water flow rate out of the subterranean formation and other process conditions. The water produced from the recovery well 50 is directed to a reverse osmosis system 60 to form a potable water permeate stream. The potable water permeate is subsequently supplied to a potable water system 70, such as a water supply distribution system. Additional processing steps may be included without departing from the disclosed embodiments.

Figure 2:
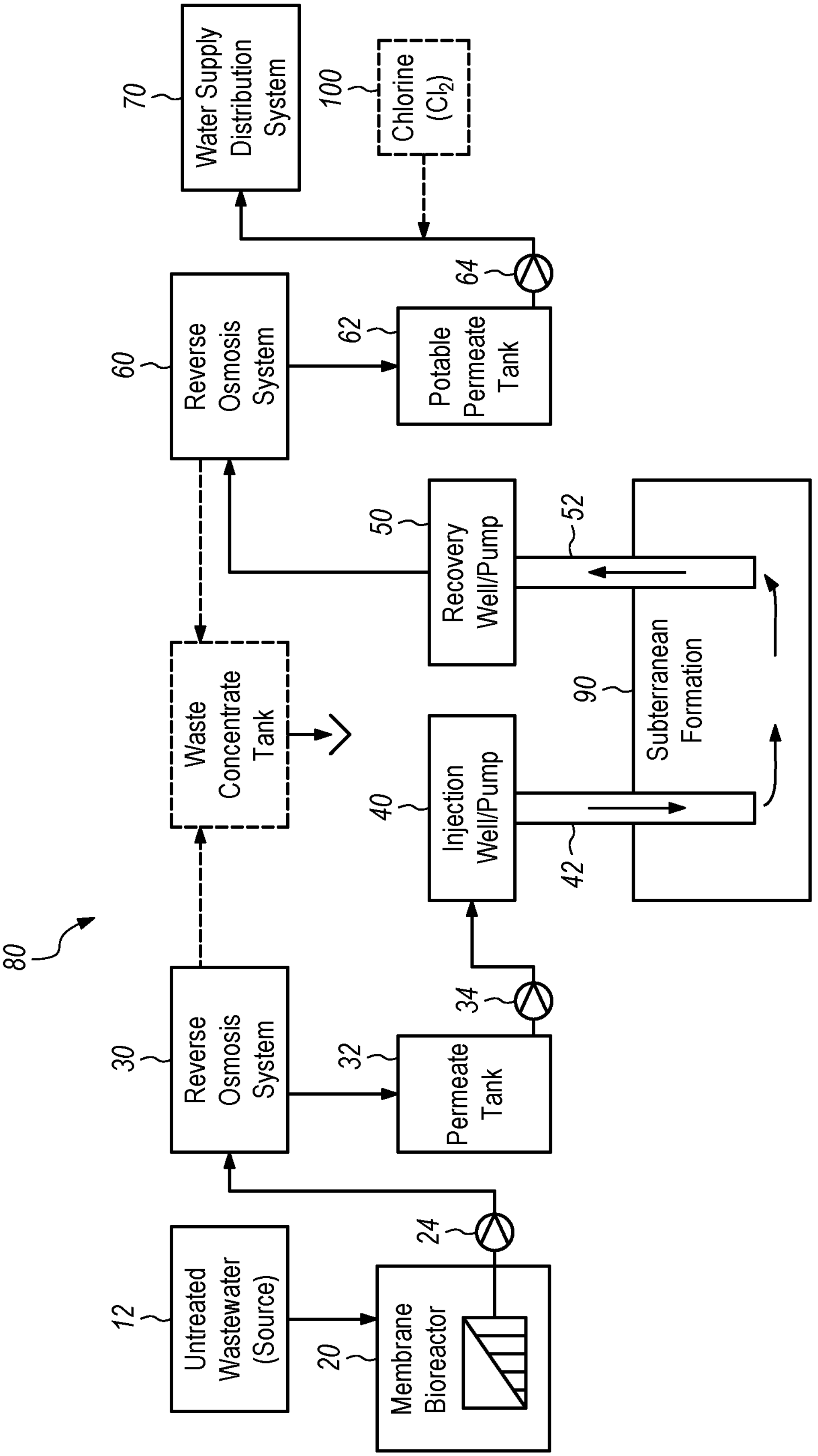
FIG. 2 is a diagram of a wastewater treatment system for production of potable water from wastewater.

FIG. 2 is a diagram of a wastewater treatment system 80 for production of treated effluent from wastewater. The wastewater treatment system 80 receives untreated wastewater 12 and processes the untreated wastewater in the membrane bioreactor 20 to produce a treated effluent. The treated effluent is then provided to the first reverse osmosis system 30 and then the injection well 40. The recovery well 50 may be used to obtain water from the subterranean formation and provide the water to the reverse osmosis system 60. A permeate water is obtained from the reverse osmosis system 60 and provided to the potable water supply distribution system 70.

The wastewater influent to the wastewater treatment plant 20 is output to a membrane bioreactor 20 that produces a treated effluent. When the MBR system 20 is ready to process the treated effluent, an effluent pump 24 may be used to draw the treated effluent from the membrane bioreactor 20. The treated effluent may be delivered directly to the permeate vessel 32 or to the optional first reverse osmosis system 30 under pressure. Optionally, the first reverse osmosis system 30 may include its own pumps to bring the treated effluent up to a sufficiently high pressure to effectively utilize the semipermeable membranes within the first reverse osmosis system 30. The treated effluent permeate that passes through the semipermeable membranes of the first reverse osmosis system 30 may be collected in a first permeate vessel 32.

Treated effluent permeate from the first permeate vessel 32 may be provided to the injection well 40 using a first permeate pump 34. The injection well 40 may include its own injection well pump (not shown) to push the water down an injection well pipe 42 and into the subterranean formation 90.

The recovery well 50 includes a recovery well pipe 52 that extends into the subterranean formation 90 at a point that is some distance of separation from the injection well pipe 42. It should be recognized that the treated effluent flow dynamics within the subterranean formation 90 is not as simple as the treated effluent from the injection well flowing directly to the recovery well. Rather, the treated effluent from the injection well may mix with existing formation water and flow through irregular or tortuous paths in directions toward and away from the recovery well as dictated by pressure gradients.

A recovery well pump (not shown) draws water up the recovery well pipe 52 from the subterranean formation 90 and delivers the produced water to a reverse osmosis system 60. Optionally, the reverse osmosis system 60 may include its own pumps to bring the water up to a sufficiently high pressure to effectively utilize the semipermeable membranes within the reverse osmosis system 60. The water permeate that passes through the semipermeable membranes of the reverse osmosis system 60 may be collected in a second permeate vessel 62.

As needed, permeate water from the second permeate vessel 62 may be withdrawn by a potable permeate pump 64 having an outlet that is coupled to a water supply distribution system 70. Optionally, a source of chlorine 100 may inject chlorine ($Cl_2$) into the potable permeate water as it is transferred to the water supply distribution system 70 or within the potable permeate vessel 62.

In some options, the recovery well pipe may be high-density polyethylene (HDPE) pipe. Preferably, all components downstream of the recovery well pump 50 are approved for use in potable water systems so as to avoid any re-introduction of contamination.

Figure 3:
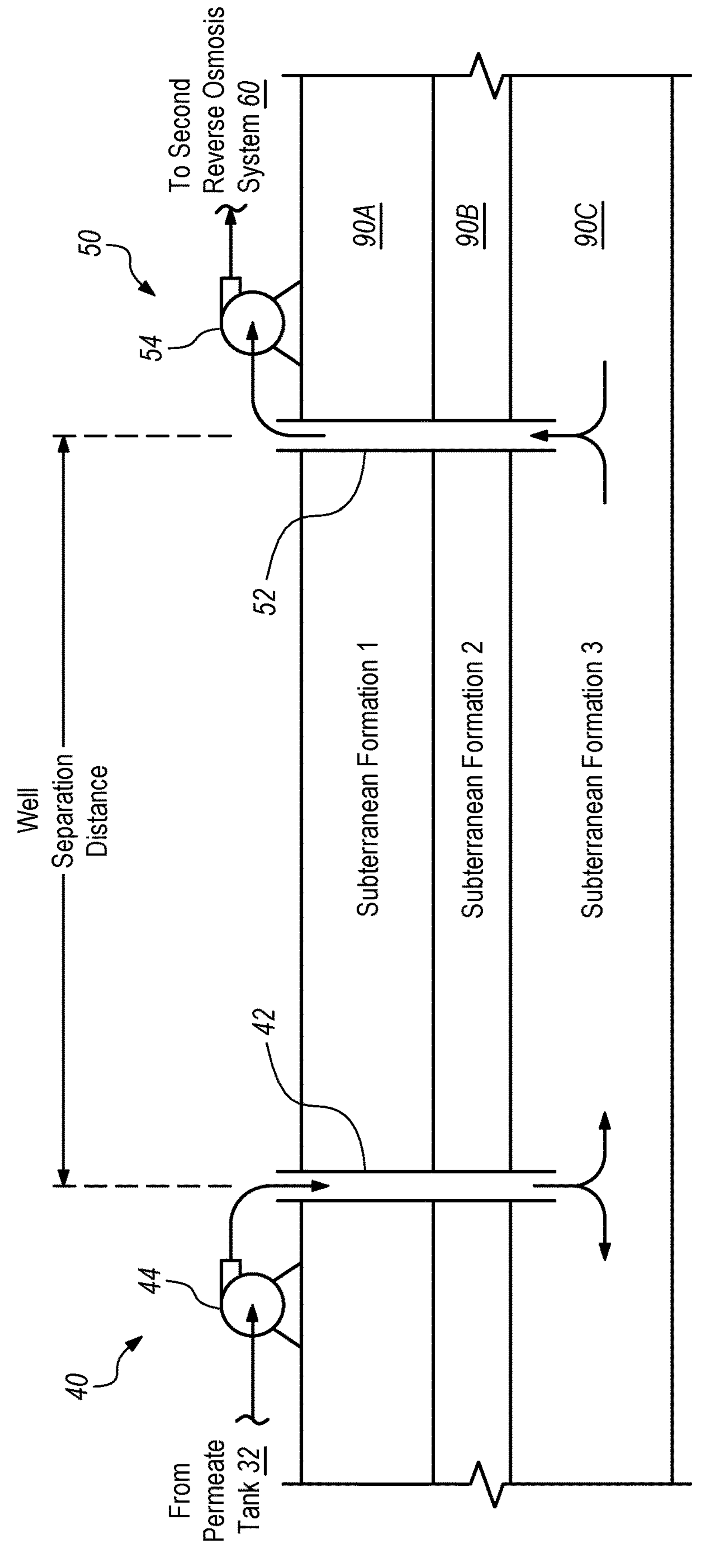
FIG. 3 is a diagram of the injection and recovery wells that direct water through one or more subterranean formation.

FIG. 3 is a diagram of the injection and recovery wells 40, 50 that direct treated effluent in and through one or more subterranean formation 90A-C. As illustrated, the injection and recovery wells 40, 50 include pipes 42, 52, respectively, which extend from ground level through a first subterranean formation 90A, through a second subterranean formation 90B, and have an open end positioned within a third subterranean formation 90C. A well separation distance, as illustrated, may vary according to the formation type, but is preferably between about 200 and about 500 feet.

Treated effluent from the permeate vessel 32 (see FIG. 2) is supplied to the injection well pump 44 and treated effluent output from the injection well pump 44 is directed into the injection well pipe 42. The treated effluent travels down the pipe 42 and into the formation 90C, where the treated effluent becomes mixed, remediated and/or conditioned before reaching the lower open end of the recovery well pipe 52. The recovery well pump 54 draws water from the formation 90C through the lower open end, up through the recovery well pipe 52 to ground level. The outlet from the recovery well pump 54 is then connected to the reverse osmosis system 60.

Figure 4A:
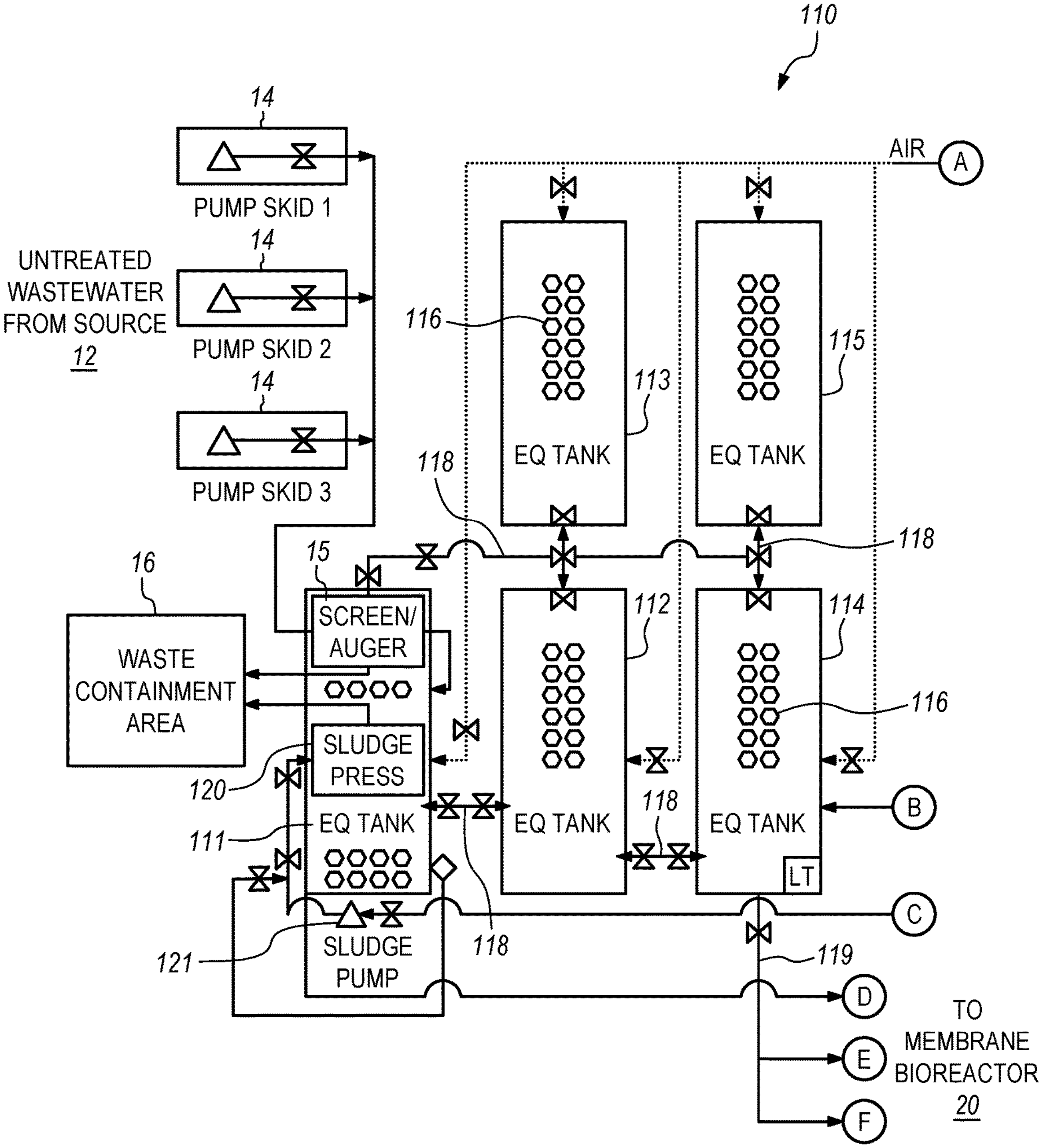
FIGS. 4A-C are process flow diagrams of a wastewater treatment system according to some embodiments.
Figure 4B:
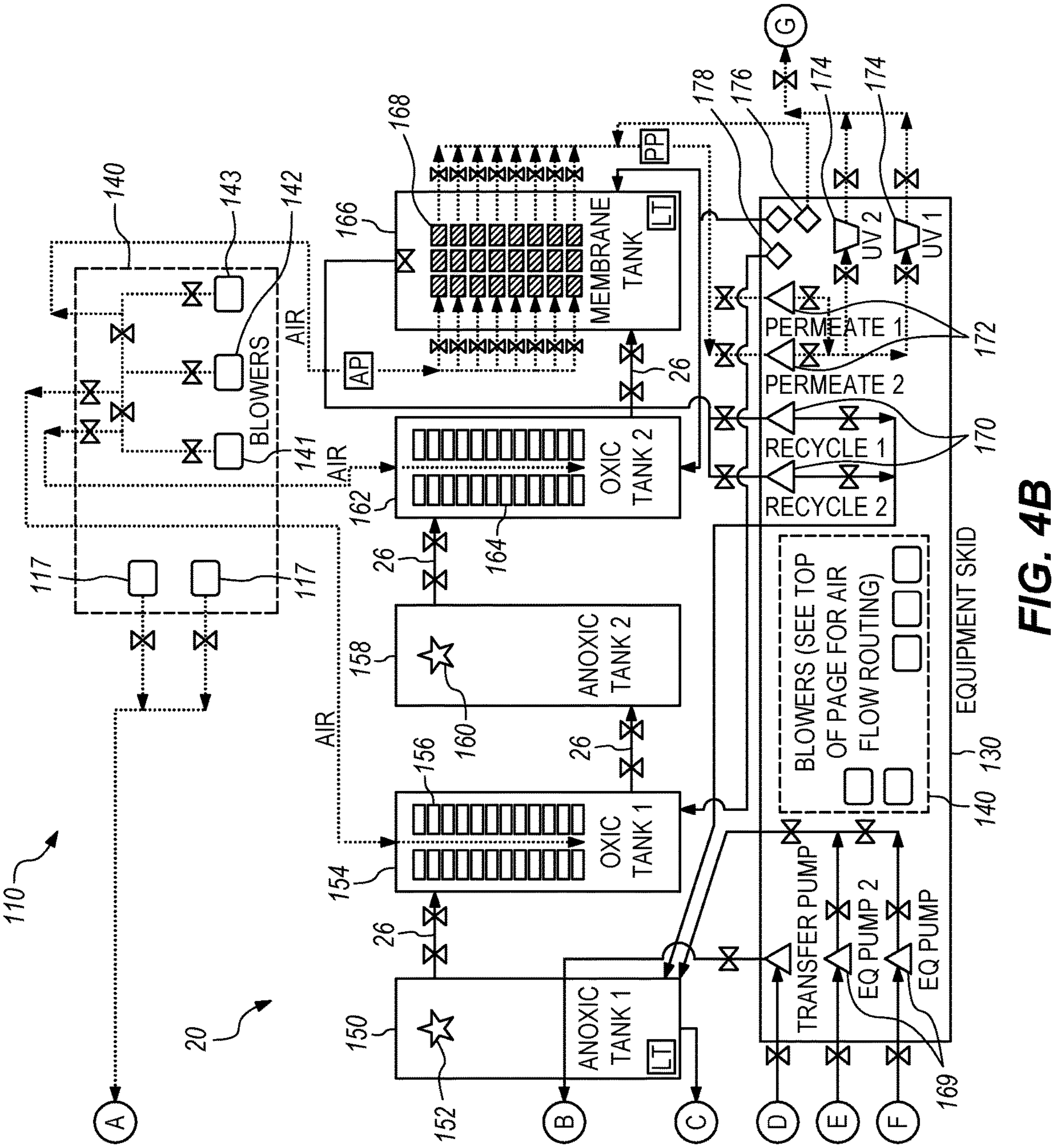
Figure 4C:
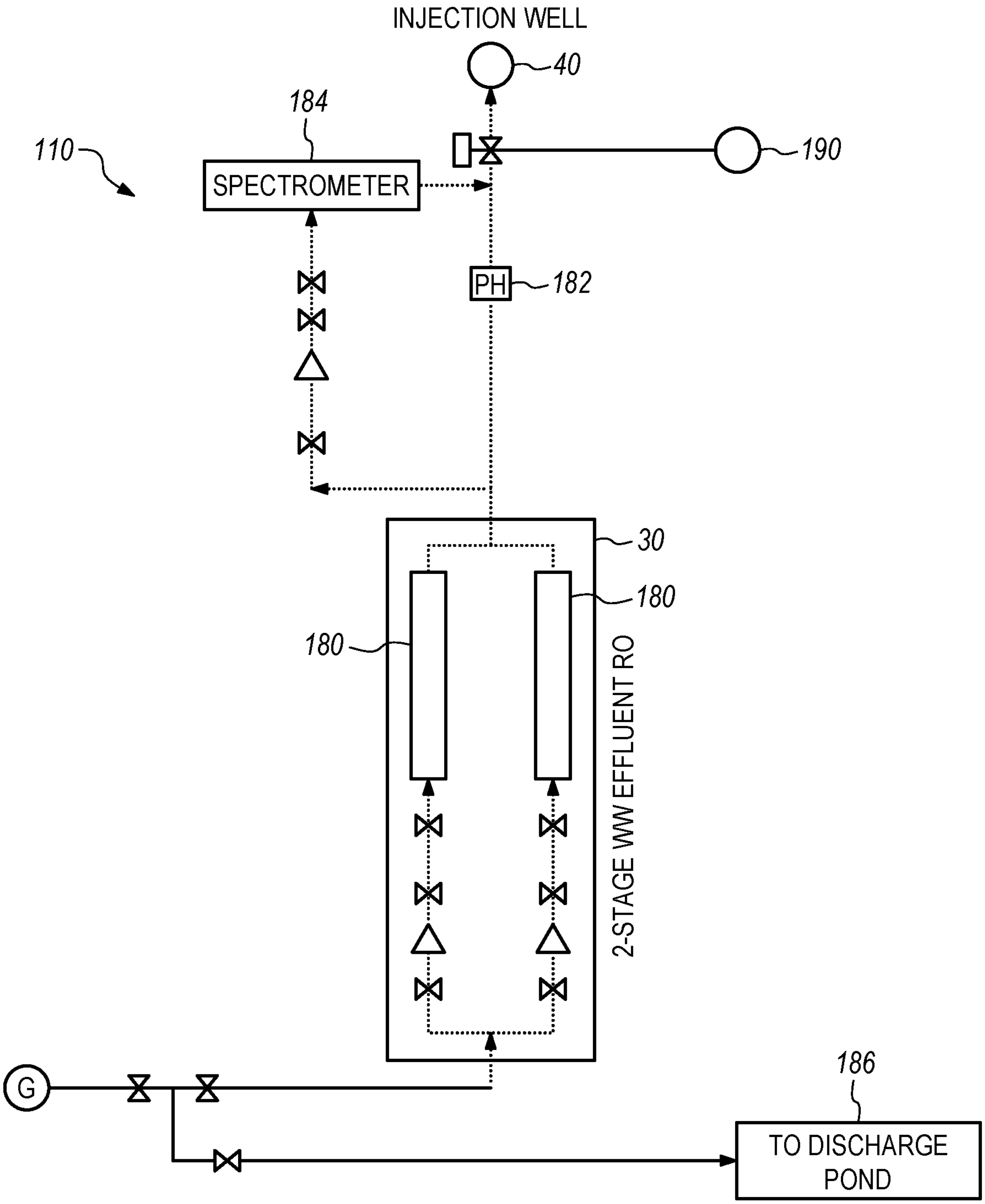

FIGS. 4A-C collectively provide a process flow diagram of a wastewater treatment system 110 according to some embodiments. These Figures include line connectors that are labeled with circles around the letters A-G, which may be aligned by placing FIGS. 4A-C side to side from left to right. Accordingly, line connectors A-F on the right-hand side of FIG. 4A align with corresponding line connector A-F on the left-hand side of FIG. 4B, and the line connector G on the right-hand side of FIG. 4B aligns with the corresponding line connector G on the right-hand side of FIG. 4C. The line connectors do not themselves signify any aspect of the wastewater treatment system and are provided merely to allow the process flow diagram to be illustrated over three separate pages.

FIG. 4A is a first part of the process flow diagram for the wastewater treatment system 110 illustrating one embodiment of components located primarily between the untreated wastewater source 12 and the membrane bioreactor 20 of FIG. 2. Specifically, optional pump skids 14 are provided to support the offloading of untreated wastewater from the wastewater source 12 (see FIG. 2) via truck (not shown). Alternatively, the input to one or more pumps 14 could be coupled to one or more pipes coming directly from a nearby wastewater collection system. However, the wastewater treatment system 110 of FIGS. 4A-C may be a semi-batch process, wherein the untreated wastewater is delivered in batches while the wastewater is processed continuously through the membrane bioreactor system of the wastewater treatment plant.

The influent pumps 14 transfer the influent untreated wastewater through a screen and auger unit 15 and into a first equalization vessel. The screen and auger unit is designed to remove garbage that is not readily subject to biological degradation, such as discarded consumer products. For example, the influent untreated wastewater may be delivered onto the screen, such that the untreated wastewater passes through the screen into the first equalization vessel 111. However, the screen prevents passage of any garbage, and the auger draws the garbage across and away from the screen so that the garbage falls into a waste container 16.

Any number of equalization vessels may be included in the wastewater treatment system 110. The one or more equalization (EQ) vessels, such as the five equalization vessels 111-115 shown in FIG. 4A, may be open top vessels with coarse air diffusers 116 (shown as hexagons) in the bottom. Air from one or more blowers 117 (see FIG. 4B) is supplied to the diffusers 116 and allowed to bubble up through the volume of water in each equalization vessel. Although the equalization vessels 111-115 may initiate some bacterial digestion of the wastewater, another purpose of the equalization vessels is to enable the wastewater treatment system 110 to receive large batches of untreated wastewater from one or more source, such as individual homes, businesses or septic systems. For example, the untreated wastewater influent to the wastewater treatment system may be received by truck and offloaded at one or more pumps skids 14. Accordingly, the untreated wastewater influent is pumped through the screen or auger and into a group of one or more equalization vessels. The number and size of equalization vessels may be varied according to an intended capacity of the wastewater treatment system, a type and strength of the waste, and the elevation among other possible factors. As shown, if there are multiple equalization vessels, they may be interconnected by pipes 118 so that the vessels may have substantially the same level of influent water. Optionally, some of the valves in the interconnecting pipes 118 may be closed to force the water to flow through the vessels in series before advancing to a final equalization vessel. In FIG. 4A, the final equalization vessel 114 has a pipe 119 that supports transfer of the untreated wastewater from the equalization vessels to the membrane bioreactor 20 in FIG. 4B.

Wastewater or sludge from the membrane bioreactor 20 in FIG. 4B is returned (connecting line C) to a sludge pump 121 and into a sludge press 120. The sludge press 120 dewaters the sludge, returning the released wastewater into the first equalization vessel 111 and discarding the solids to the waste container 16 or, more preferably, into a separate waste container so that the sludge waste is kept separate from the garbage removed by the screen or auger. An optional "transfer pump" shown in FIG. 4B may provide circulation and/or be used to manage the levels in the equalization vessels.

FIG. 4B is a second part of the process flow diagram for the wastewater treatment system 110 illustrating one embodiment of components in the membrane bioreactor 20 of FIG. 2 as well as an equipment skid 130 with a blower module unit 140. Although the blower module unit 140 may be physically positioned on the equipment skid 130, the unit is illustrated in more detail near the top of FIG. 4B. Specifically, the blower module unit 140 may include the equalization vessel blowers 117, as well as blowers 141, 142, 143 for supplying air to one or more unit processes of the membrane bioreactor 20.

In the illustrated embodiment, the membrane bioreactor 20 includes five vessels connected in a series by interconnecting pipes 26 (four connecting pipes shown). For example, the membrane bioreactor 20 includes a first anoxic vessel 150 with a first mixer 152, a first oxic vessel 154 with a first set of fine air diffusers 156, a second anoxic vessel 158 with a second mixer 160, a second oxic vessel 162 with a second set of fine air diffusers 164, and a membrane vessel 166 with a plurality of submerged membrane modules 168 (a set of 24 membrane modules shown). The first set of fine air diffusers 156 in the first oxic vessel 154 and the second set of fine air diffusers 164 in the second oxic vessel 162 are supplied with air from the blowers 141, 142, 143, which may be operated collectively or separately.

Equalization pumps 169 transfer untreated wastewater from the final equalization vessel 114 into a first anoxic vessel 150. The anoxic vessels 150, 158 are vessels with no added air, such that the oxygen content is low and may be substantially depleted. The low oxygen content in each anoxic vessel causes denitrification of the organic content in the water, such as the conversion of nitrate to molecular nitrogen ($N_2$). The oxic vessels 154, 162 are vessels with plenty of oxygen provided by fine air diffusers 156, 164, respectively. The high oxygen content in each oxic vessel causes nitrification, such as the conversion of ammonia nitrogen to nitrate.

Wastewater that has been processed through the last (i.e., second in this example) oxic vessel 162 then flows to the membrane vessel 166. The membrane vessel 166 includes a set of submerged Maxflow membrane (ultrafiltration) modules 168. The submerged membrane modules have fine pores that allow the passage of water molecules (i.e., the permeate) therethrough, but prevent the passage of organic matter (i.e., the retentate) that exceeds the pore size of the membrane. Permeate pumps 172 draw a suction on the inside of the membrane modules 168 that pulls water molecule (permeate) through the pores of the membrane material that forms the membrane modules. This process may be referred to as ultrafiltration. The treated effluent (permeate) that is drawn through the permeate pumps 172 may in this non-limiting example, then be subjected to ultraviolet (UV) light in ultraviolet units 174 before being conveyed to the third section of the wastewater treatment process 110 in FIG. 4C.

Recycle pumps 170 return sludge or mixed liquor suspended solids (MLSS) from the membrane vessel 166 back to the first anoxic vessel 150 to cause circulation through the vessels 150, 154, 158, 162, 166 in series. This circulation of the sludge or mixed liquor suspended solids (MLSS) may serve to maintain a healthy population of bacteria throughout the membrane bioreactor 20 and provide a greater level of remediation.

An automatic cleaning of the membrane modules may be implemented using sodium hypochlorite or similar cleaning chemical. For example, a dosing unit 176 (such as a Dosatron® water driven hydraulic motor piston pump) may be supplied with a sodium hypochlorite solution for cleaning the membrane modules. A chemical pump 178 may also be used to provide a defoamer and/or other chemical to the membrane vessel 166, the second oxic vessel 162, and/or the first oxic vessel 154.

In another non-limiting example, the system may support performance of a method of cleaning the membrane modules 168. Accordingly, when the membrane modules reach a certain pressure (i.e., resistance due to material building on the membranes), the controller may cause the permeate pump to reverse direction and pull sodium hypochlorite into the inner space of the membrane modules or plates. The sodium hypochlorite may be allowed to soak for a given amount of time, then the permeate pumps reversed again to their original direction to draw out the sodium hypochlorite and then continue the process of extracting treated effluent from the membrane modules. Other cleaning methods may be used.

FIG. 4C is a third part of the process flow diagram for the wastewater treatment system 110 receiving treated effluent (connecting line G) from the output of the membrane bioreactor 20, perhaps after treatment with the ultraviolet units 174. A pair of reverse osmosis (RO) units 180 are provided to further filter small particles from the treated effluent. These RO units 180 may form the reverse osmosis system 30 of FIG. 2. The output of the reverse osmosis units 180 may be tested with a pH sensor 182 and/or a spectrometer 184 to verify that the treated effluent output meets any required standard for a given use of the treated effluent. Optionally, the pH sensor 182, the spectrometer 184 and/or any other helpful sensor may provide output to a control system (not shown; but see FIG. 5). The control system may monitor these sensors and automatically control where the treated effluent is directed. For example, the treated effluent output may be normally directed to an injection well 40, but the control system may redirect the treated effluent to a water storage vessel 190 in response to detecting that the treated effluent output does not meet a predetermined quality or parameter. As an alternative to the injection well 40, the treated effluent could even bypass the reverse osmosis units 180 and be directed to a discharge pond 186.

It should be recognized that the wastewater treatment system 110 of FIGS. 4A-C, or individual components or systems, may be used in various embodiments and that more or fewer components or processes may be included. For example, FIG. 4C does not show a recovery well or various other uses of the treated effluent. However, as shown in FIGS. 1-3, a recovery well 50 and subsequent processing may be implemented.

Figure 5:
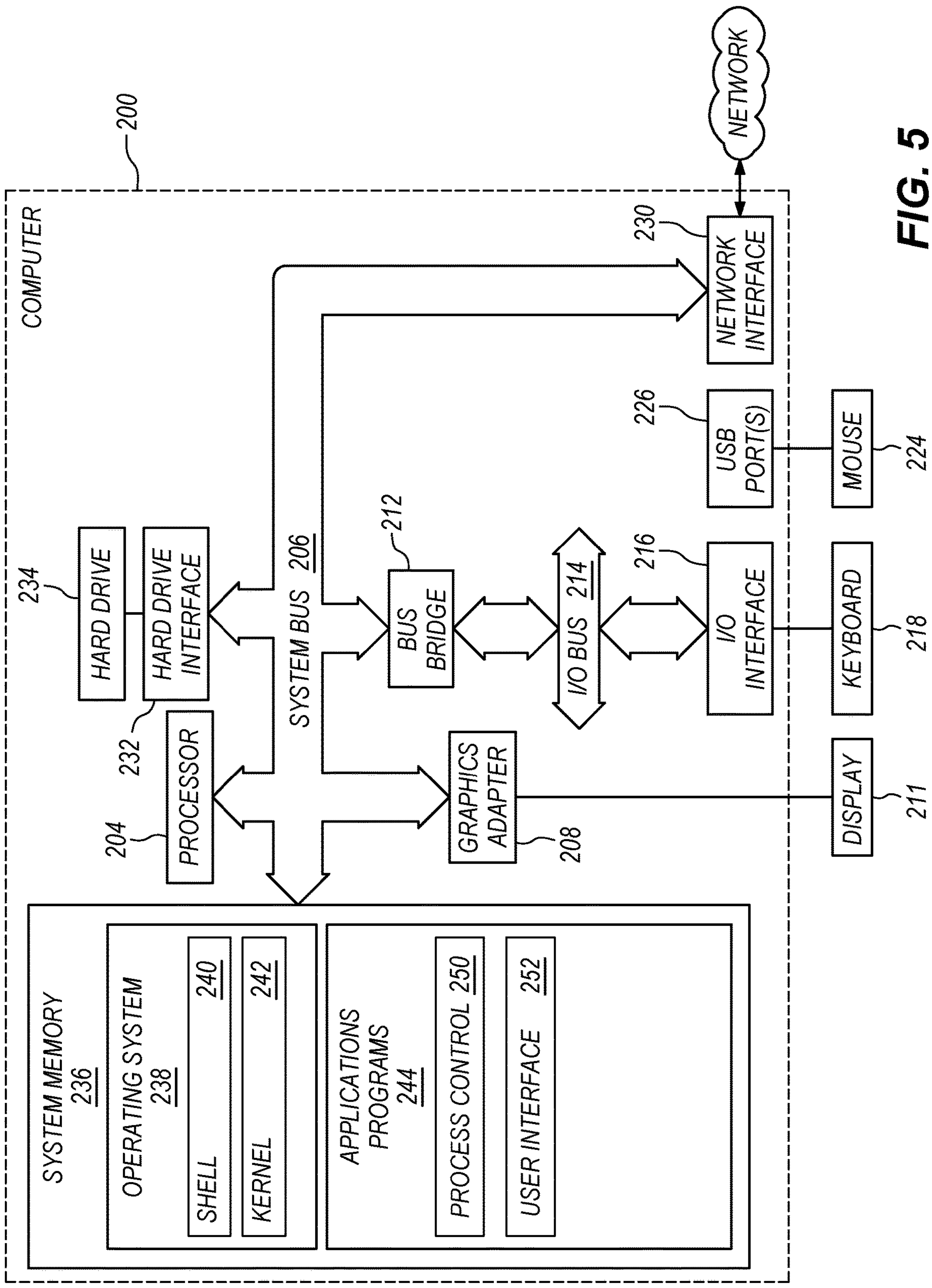
FIG. 5 is a diagram of a computing device that may be representative of a controller used to control operation of the wastewater treatment system.

FIG. 5 is a diagram of a computer 200 that may be representative of a controller used to control operation of the water treatment system 80, 110 or any portion thereof. The computer 200 includes a processor unit 204 that is coupled to a system bus 206. The processor unit 204 may utilize one or more processors, each of which has one or more processor cores. A graphics adapter 208, which drives/supports the display 211, is also coupled to system bus 206. The graphics adapter 208 may for example, include a graphics processing unit (GPU). The system bus 206 is coupled via a bus bridge 212 to an input/output (I/O) bus 214. An I/O interface 216 is coupled to the I/O bus 214. The I/O interface 216 may facilitate communication with various I/O devices, such as a keyboard 218 (such as a touch screen virtual keyboard), and a USB mouse 224 via USB port(s) 226 (or other type of pointing device, such as a trackpad). As depicted, the computer 200 is able to communicate with other network devices over a network using a network adapter or network interface controller 230. For example, the computer 200 may communicate with various computing devices over a network, including a wide area network such as the Internet. Specifically, the network interface 230 may enable the computer 200 to communicate with another computing device that enables remote monitoring and/or control of one or more aspect of the wastewater treatment system.

A hard drive interface 232 is also coupled to the system bus 206. The hard drive interface 232 interfaces with a hard drive 234. In some embodiments, the hard drive 234 communicates with system memory 236, which is also coupled to the system bus 206. System memory is defined as a lowest level of volatile memory in the computer 200. This volatile memory includes additional higher levels of volatile memory (not shown), including, but not limited to, cache memory, registers and buffers. Data that populates the system memory 236 includes the operating system (OS) 238 and application programs 244. The hardware elements depicted in the computer 200 are not intended to be exhaustive, but rather are representative. For instance, the computer 200 may include non-volatile memory and the like.

The operating system 238 includes a shell 240 for providing transparent user access to resources such as application programs 244. Generally, the shell 240 is a program that provides an interpreter and an interface between the user and the operating system. More specifically, the shell 240 executes commands that are entered into a command line user interface or from a file. Thus, the shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while the shell 240 may be a text-based, line-oriented user interface, embodiments may support other user interface modes, such as graphical, voice, gestural, etc.

As depicted, the operating system 238 also includes the kernel 242, which includes lower levels of functionality for the operating system 238, including providing essential services required by other parts of the operating system 238 and application programs 244. Such essential services may include memory management, process and task management, disk management, and mouse and keyboard management. As shown, the computer 200 includes application programs 244 in the system memory of the computer 200, including, without limitation, a process control application 250 for controlling the wastewater treatment system and a user interface 252 supporting remote user monitoring and control.

It should be understood that embodiments of the systems may include controllers (computers) and control elements for controlling and managing the operation of individual components of the system and/or the overall process. Furthermore, any of the disclosed processes may be implemented and controlled using program instructions that are executable by a computer processor to cause the computer to communicate with individual components of the system to provide control signals. Various sensors may also provide input to the computer and inform control logic implemented by the program instructions. Furthermore, embodiments may include computer program products that include program instructions for implementing or initiating any one or more aspects of the methods described herein. Similarly, the system embodiments may include a computer that processes the program instructions to implement or initiate any one or more aspects of the methods described herein.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may" and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A method, comprising:

receiving untreated wastewater from a wastewater source;

processing the untreated wastewater in a membrane bioreactor to produce a treated effluent;

processing the treated effluent in a first reverse osmosis system to produce an effluent permeate;

injecting the effluent permeate into a subterranean formation through an injection well;

extracting formation water from the subterranean formation through a recovery well;

processing the formation water in a reverse osmosis system to produce a permeate water stream; and supplying the permeate water stream to a potable water distribution system.

2. The method of claim 1, wherein the wastewater source processes domestic wastewater.

3. The method of claim 1, wherein the membrane bioreactor includes a plurality of vessels connected in series, the plurality of vessels including at least one anoxic vessel, at least one oxic vessel and at least one membrane vessel.

4. The method of claim 3, further comprising:

causing the untreated wastewater to flow through the at least one anoxic vessel and the at least one oxic vessel before the untreated wastewater flows into the membrane vessel.

5. The method of claim 4, further comprising:

mixing the untreated wastewater within the at least one anoxic vessel;

aerating the untreated wastewater within the at least one oxic vessel; and applying a vacuum pressure to one side of a plurality of submerged membrane modules within the membrane vessel to draw a membrane module permeate through pores in the submerged membrane modules, wherein the membrane module permeate from the submerged membrane modules forms the treated effluent.

6. The method of claim 5, further comprising:

exposing the treated effluent to ultraviolet light upstream of the first reverse osmosis system.

7. The method of claim 5, wherein the submerged membrane modules having a pore size of about 0.038 microns.

8. The method of claim 5, further comprising:

continuously circulating a portion of the wastewater from the membrane vessel back through the at least one anoxic vessel and the at least one oxic vessel.

9. The method of claim 8, further comprising:

withdrawing excess sludge from the at least one of the plurality of vessels forming the membrane bioreactor;

dewatering the excess sludge in a sludge press to form a solid waste and a recovered wastewater; and returning the recovered wastewater from the sludge press into an equalization vessel that supplies wastewater to the membrane bioreactor.

10. The method of claim 8, wherein the at least one anoxic vessel and the at least one oxic vessel include a first anoxic vessel, a first oxic vessel, a second anoxic vessel, and a second oxic vessel connected in series upstream of the membrane vessel.

11. The method of claim 10, further comprising:

storing the untreated wastewater in at least one equalization vessel;

aerating the untreated wastewater within the at least one equalization vessel; and drawing the untreated wastewater from the at least one equalization vessel into the membrane bioreactor to maintain a wastewater level in the membrane bioreactor.

12. The method of claim 11, wherein the untreated wastewater is received into the at least one equalization vessel in batches.

13. The method of claim 1, wherein the injection well and the recovery well are separated by a distance ranging from about 200 feet to about 500 feet.

14. The method of claim 1, further comprising:

adding from 0.5 part per million to 2 parts per million of chlorine to the permeate water stream upstream of a point where the permeate water stream is supplied to the potable water distribution system.

15. The method of claim 1, further comprising:

adding chlorine to the permeate water stream upstream of a point where the permeate water stream is supplied to the potable water distribution system, wherein an amount of the chlorine added to the permeate water stream is sufficient to result in the permeate water stream having a chlorine concentration ranging from 0.5 part per million to 2 parts per million.

16. The method of claim 1, further comprising:

detecting whether the effluent permeate meets a predetermined quality or parameter; and automatically controlling where the effluent permeate is direct in response to detecting that the treated effluent output does not meet a predetermined quality or parameter.

17. A method, comprising:

receiving untreated wastewater from a wastewater source;

processing the untreated wastewater in a membrane bioreactor to produce a treated effluent, wherein the membrane bioreactor includes a plurality of vessels connected in series, the plurality of vessels including at least one anoxic vessel, at least one oxic vessel and at least one membrane vessel;

processing the treated effluent in a first reverse osmosis system to produce an effluent permeate;

causing the untreated wastewater to flow through the at least one anoxic vessel and the at least one oxic vessel before the untreated wastewater flows into the membrane vessel, mixing the untreated wastewater within the at least one anoxic vessel;

aerating the untreated wastewater within the at least one oxic vessel;

applying a vacuum pressure to one side of a plurality of submerged membrane modules within the membrane vessel to draw a membrane module permeate through pores in the submerged membrane modules, wherein the membrane module permeate from the submerged membrane modules forms the treated effluent;

continuously circulating a portion of the wastewater from the membrane vessel back through the at least one anoxic vessel and the at least one oxic vessel;

directing the treated effluent to another system for use;

monitoring the treated effluent with an optical spectrometer; and automatically diverting the treated effluent to a vessel in response to the optical spectrometer indicating that the treated effluent contains more than a predetermined threshold amount of a contaminant.

18. A wastewater treatment system, comprising:

a membrane bioreactor having an inlet adapted to receive untreated wastewater and a treated effluent outlet;

a first reverse osmosis system having an inlet coupled to the treated effluent outlet and having a first effluent permeate outlet;

an injection well pump having an injection well pump inlet coupled to the first effluent permeate outlet and an injection well pump outlet coupled to an injection well that extends into a subterranean formation;

a recovery well pump having a recovery well pump inlet coupled to a recovery well that extends into the subterranean formation and a recovery well pump outlet; and a second reverse osmosis system having an inlet coupled to the recovery well pump outlet and a water permeate outlet coupled to a potable water distribution system.

19. The wastewater treatment system of claim 18, wherein the membrane bioreactor includes a plurality of vessels connected in series, the plurality of vessels including at least one anoxic vessel, at least one oxic vessel and at least one membrane vessel, wherein the at least one membrane vessel includes a plurality of submerged membrane modules.

20. The wastewater treatment system of claim 18, wherein the injection well and the recovery well are separated by a distance ranging from about 200 feet to about 500 feet.

* * * * *